US012657172B2

(12) United States Patent
Yang

(10) Patent No.: US 12,657,172 B2
(45) Date of Patent: Jun. 16, 2026

(54) METHODS AND SYSTEMS FOR CONSTRUCTING DATA OF KNOWLEDGE GRAPH, AND NON-TRANSIENT COMPUTER-READABLE MEDIA

(71) Applicant: Alipay (Hangzhou) Information Technology Co., Ltd., Hangzhou (CN)

(72) Inventor: Jin Yang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 652 days.

(21) Appl. No.: 18/307,472

(22) Filed: Apr. 26, 2023

(65) Prior Publication Data

US 2023/0342636 A1 Oct. 26, 2023

(30) Foreign Application Priority Data

Apr. 26, 2022 (CN) .......................... 202210440938.X

(51) Int. Cl.
*G06F 16/21* (2019.01)
*G06F 16/901* (2019.01)
*G06N 5/022* (2023.01)

(52) U.S. Cl.
CPC ........ *G06F 16/219* (2019.01); *G06F 16/9024* (2019.01); *G06N 5/022* (2013.01)

(58) Field of Classification Search
CPC ... G06N 5/022; G06F 16/9024; G06F 16/219; G06F 16/9537
See application file for complete search history.

(56) References Cited

U.S. PATENT DOCUMENTS

| | | | | | |
|---|---|---|---|---|---|
| 9,946,808 | B2 * | 4/2018 | Muchinsky | ......... | G06F 16/9024 |
| 10,409,782 | B2 * | 9/2019 | Zhang | ................. | G06F 16/9024 |
| 10,831,452 | B1 * | 11/2020 | Hunter | ...................... | G06F 8/65 |
| 10,915,578 | B1 * | 2/2021 | Hunter | ................. | G06F 9/5038 |
| 10,990,879 | B2 * | 4/2021 | Hunter | ................. | G06N 3/086 |
| 11,132,403 | B2 * | 9/2021 | Hunter | .................... | G06F 9/542 |

(Continued)

FOREIGN PATENT DOCUMENTS

| | | |
|---|---|---|
| CN | 103678494 | 3/2014 |
| CN | 108062368 | 5/2018 |

(Continued)

OTHER PUBLICATIONS blog.csdn.net [online], "Four extraction modes for incremental data," Jul. 11, 2018, retrieved on Jul. 21, 2023, retrieved from URL<https://blog.csdn.net/mochou111/article/details/80995156>, 12 pages (with machine translation).

(Continued)

*Primary Examiner* — Jorge A Casanova
(74) *Attorney, Agent, or Firm* — Fish & Richardson P.C.

(57) ABSTRACT

Constructing knowledge graph data is described. Full data of a knowledge graph at a specified time is obtained. Incremental data of the full data is calculated relative to full data obtained at a previous time granularity. A version number of the incremental data is generated at least partially based on the specified time. By using a protocol and as a dynamic mapping, a node and an edge of the knowledge graph that are associated with the incremental data are dynamically mapped. The incremental data with reference to the version number is stored as stored incremental data.

20 Claims, 8 Drawing Sheets

400

410
Obtain full data of a knowledge graph at a specified time

420
Calculate incremental data of the full data relative to full data obtained at a previous time granularity 430
Generate a version number of the incremental data at least partially based on the specified time 440
Dynamically map, by using a protocol, a node and an edge of the knowledge graph that are associated with the incremental data 450
Store the incremental data with reference to the version number

(56)                References Cited

U.S. PATENT DOCUMENTS

| | | | | |
|---|---|---|---|---|
| 11,687,527 | B2 * | 6/2023 | Crabtree ............. | G06F 16/9024 |
| | | | | 707/692 |
| 11,947,529 | B2 * | 4/2024 | Gasper .................. | G06F 16/906 |
| 2005/0076264 | A1 | 4/2005 | Rowan et al. | |
| 2013/0151231 | A1 | 6/2013 | Giraudy et al. | |
| 2014/0067762 | A1 * | 3/2014 | Carvalho ................ | G06F 16/27 |
| | | | | 707/636 |
| 2015/0350324 | A1 * | 12/2015 | Hu ...................... | H04L 67/1097 |
| | | | | 709/219 |
| 2019/0317961 | A1 * | 10/2019 | Brener ................ | G06F 16/9035 |
| 2019/0347347 | A1 * | 11/2019 | Griffith ................... | G06F 16/26 |
| 2023/0169124 | A1 * | 6/2023 | Brener ................ | G06F 16/9024 |
| | | | | 707/740 |
| 2023/0169360 | A1 * | 6/2023 | Busany .................. | G06N 5/022 |
| | | | | 706/46 |
| 2024/0202244 | A1 * | 6/2024 | Daviau .............. | G06F 16/9024 |
| 2025/0292108 | A1 * | 9/2025 | Portisch .............. | G06N 3/0455 |
| 2025/0371001 | A1 * | 12/2025 | Colmenares Diaz ........................ | |
| | | | | G06F 16/24526 |

FOREIGN PATENT DOCUMENTS

| | | |
|---|---|---|
| CN | 109871373 | 6/2019 |
| CN | 109902130 | 6/2019 |
| CN | 109918386 | 6/2019 |
| CN | 110795495 | 2/2020 |
| CN | 111209444 | 5/2020 |
| CN | 111475602 | 7/2020 |
| CN | 113901231 | 1/2022 |

OTHER PUBLICATIONS my.oschina.net [online], "The road to Big Data, four extraction modes for incremental data," Jul. 9, 2017, retrieved on Jul. 21, 2023, retrieved from URL<https://my.oschina.net/u/3620858/blog/5126171>, 15 pages (with machine translation).

* cited by examiner

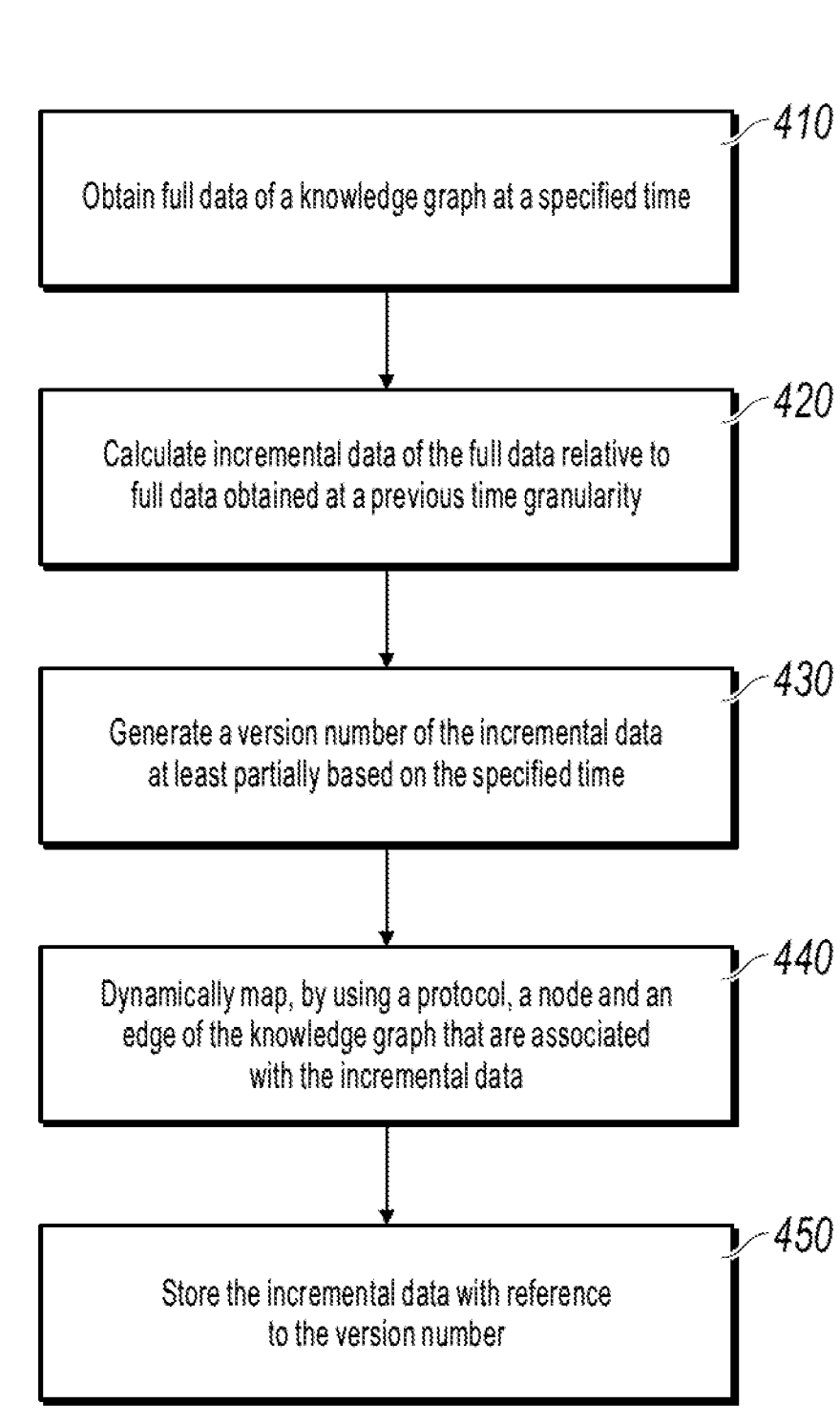

*400*

*410*

Obtain full data of a knowledge graph at a specified time

*420*

Calculate incremental data of the full data relative to full data obtained at a previous time granularity

*430*

Generate a version number of the incremental data at least partially based on the specified time

*440*

Dynamically map, by using a protocol, a node and an edge of the knowledge graph that are associated with the incremental data

*450*

Store the incremental data with reference to the version number

FIG. 4

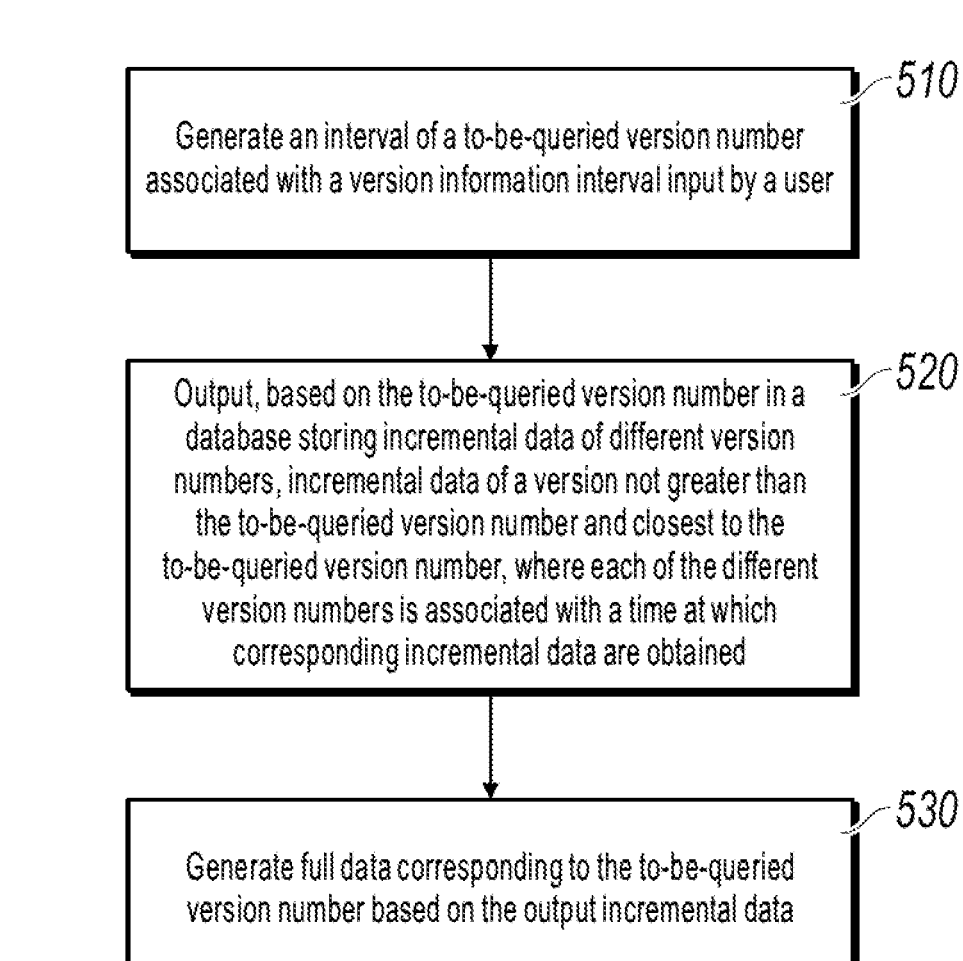

*500*

*510*

Generate an interval of a to-be-queried version number associated with a version information interval input by a user

*520*

Output, based on the to-be-queried version number in a database storing incremental data of different version numbers, incremental data of a version not greater than the to-be-queried version number and closest to the to-be-queried version number, where each of the different version numbers is associated with a time at which corresponding incremental data are obtained

*530*

Generate full data corresponding to the to-be-queried version number based on the output incremental data

FIG. 5

*600*

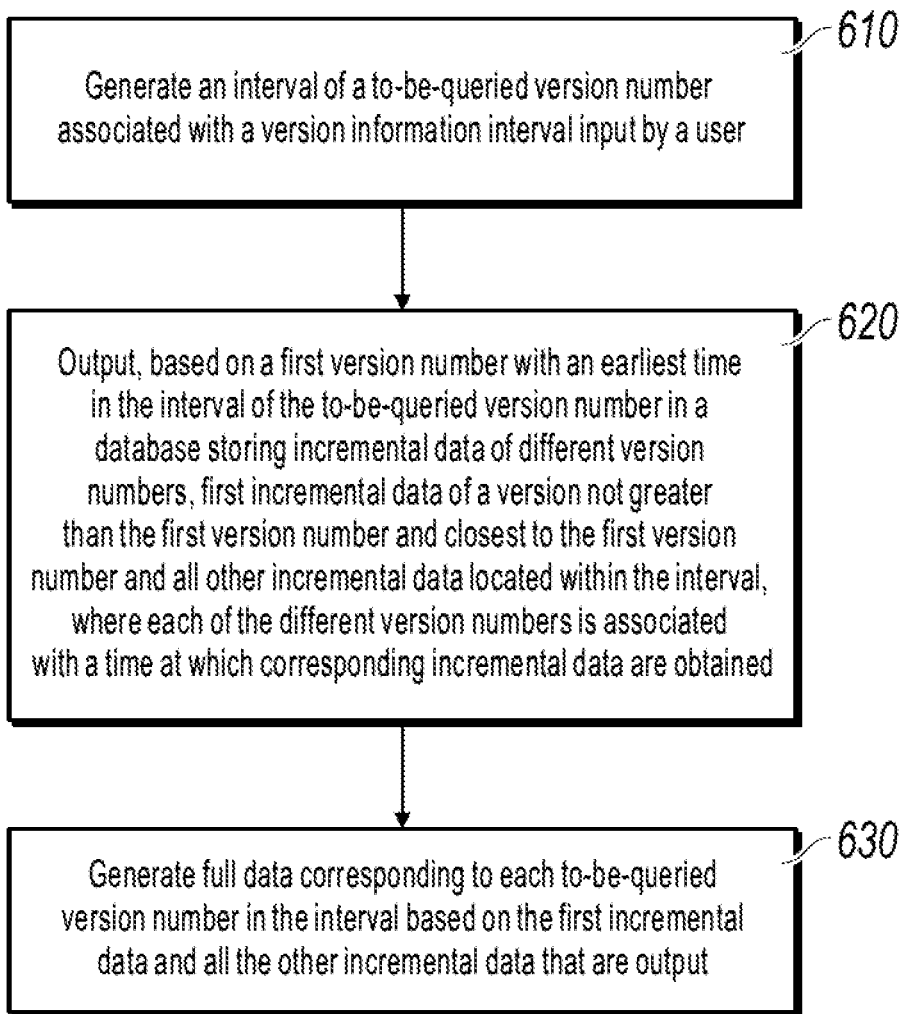

*610*

Generate an interval of a to-be-queried version number associated with a version information interval input by a user

*620*

Output, based on a first version number with an earliest time in the interval of the to-be-queried version number in a database storing incremental data of different version numbers, first incremental data of a version not greater than the first version number and closest to the first version number and all other incremental data located within the interval, where each of the different version numbers is associated with a time at which corresponding incremental data are obtained

*630*

Generate full data corresponding to each to-be-queried version number in the interval based on the first incremental data and all the other incremental data that are output

Processor

*815*

Memory

*820*

Other Peripheral
Elements

*825*

Network Connection
Element

*805*

METHODS AND SYSTEMS FOR CONSTRUCTING DATA OF KNOWLEDGE GRAPH, AND NON-TRANSIENT COMPUTER-READABLE MEDIA

CROSS-REFERENCE TO RELATED APPLICATIONS

This application claims priority to Chinese Patent Application No. 202210440938.X, filed on Apr. 26, 2022, which is hereby incorporated by reference in its entirety.

TECHNICAL FIELD

This application relates to knowledge graphs, and more specifically, to methods and systems for constructing data of a knowledge graph, and non-transient computer-readable media.

BACKGROUND

In many service scenarios, users need to query and compare historical data of data of a knowledge graph, to obtain snapshot information at a specified time. Currently, most graphs store final states of entity and relational data, and it is difficult to trace back to historical data. In addition, in an event inference scenario, a snapshot corresponding to an event occurrence moment T needs to be used for inference to prevent time travel. In the above-mentioned scenario, a daily data volume is at a level of hundreds of millions, and a very large amount of storage space is occupied.

Therefore, there is a need for a multi-version storage solution in which long life cycle data can be efficiently and effectively stored.

SUMMARY

A brief summary of one or more aspects is provided below to provide a basic understanding of these aspects. This summary is not an exhaustive overview of all contemplated aspects, and is neither intended to identify crucial or critical elements of all aspects nor intended to attempt to define the scope of any or all aspects. This summary is solely intended to provide some concepts of one or more aspects in a simplified form as a preface for more detailed description provided later.

In embodiments of this specification, a knowledge graph is constructed in a multi-version method based on a time granularity, to alleviate the above-mentioned problem.

One or more embodiments of this specification provide methods and systems for constructing, storing, and querying multi-version data of a knowledge graph, and non-transient computer-readable media.

In an aspect, a method for constructing data of a knowledge graph is provided. The method includes:

Full data of the knowledge graph are obtained at a specified time; incremental data of the full data relative to full data obtained at a previous time granularity are calculated; a version number of the incremental data is generated at least partially based on the specified time; a node and an edge of the knowledge graph that are associated with the incremental data are dynamically mapped by using a protocol; and the incremental data are stored with reference to the version number.

Optionally, the method further includes: An attribute of a schema of the knowledge graph is dictionary-encoded by using the protocol after the dynamic mapping, so that the stored incremental data do not need to include the attribute.

Optionally, the method further includes: An attribute of a schema of the knowledge graph is dictionary-encoded when the dynamic mapping is performed, so that the stored incremental data do not need to include the attribute.

Optionally, the method further includes: All stored incremental data are merged based on at least one of a time-to-live of the incremental data, a maximum threshold quantity of pieces of incremental data, or a combination thereof.

Optionally, the method further includes: Each version of incremental data within the time-to-live is stored.

Optionally, the method further includes: One or more pieces of incremental data are discarded when a quantity of pieces of stored incremental data reaches the maximum threshold quantity.

Optionally, the specified time is periodically triggered based on a time granularity at which the full data are obtained.

Optionally, the time granularity is configurable.

Optionally, that incremental data are calculated includes:

When there are first data in the full data and the first data do not exist in the full data obtained at the previous time granularity, the first data are marked as added; when there are no second data in the full data and the second data exist in the full data obtained at the previous time granularity, the second data are marked as deleted; when there are third data in both the full data and the full data obtained at the previous time granularity, but some attributes of the third data are modified, the third data are marked as updated; and when fourth data in the full data are exactly the same as fourth data in the full data obtained at the previous time granularity, the fourth data are ignored, where the first data, the second data, the third data, and the fourth data are different data, and the incremental data include the first data, the second data, and the third data.

In an aspect, a method for querying full data of a knowledge graph is provided. The method includes:

A to-be-queried version number associated with version information input by a user is generated; incremental data of a version not greater than the to-be-queried version number and closest to the to-be-queried version number are output based on the to-be-queried version number in a database storing incremental data of different version numbers, where each of the different version numbers is associated with a time at which corresponding incremental data are obtained; and full data corresponding to the to-be-queried version number are generated based on the output incremental data.

Optionally, when the stored incremental data are dynamically mapped and dictionary-encoded by using a protocol, the protocol is inversely parsed to obtain the full data corresponding to the to-be-queried version number.

Optionally, the version information includes a to-be-queried timestamp or an index of the-be-queried version number.

In an aspect, a method for querying full data of a knowledge graph is provided. The method includes:

An interval of a to-be-queried version number associated with a version information interval input by a user is generated; first incremental data of a version not greater than a first version number and closest to the first version number and all other incremental data located within the interval are output based on the first version number with an earliest time in the interval of the to-be-queried version number in a database storing incremental data of different version numbers, where each of the different version numbers is associated with a time at which corresponding incremental data are obtained; and generating full data corresponding to each to-be-queried version number in the interval based on the first incremental data and all the other incremental data that are output.

In another aspect, a system for constructing data of a knowledge graph is disclosed. The system includes: a data acquisition module, configured to obtain full data of the knowledge graph at a specified time; a data comparison module, configured to calculate incremental data of the full data relative to full data obtained at a previous time granularity; a version number generation module, configured to generate a version number of the incremental data at least partially based on the specified time; a protocol mapping module, configured to dynamically map, by using a protocol, a node and an edge of the knowledge graph that are associated with the incremental data; and a storage module, configured to store the incremental data with reference to the version number.

In another aspect, a system for querying full data of a knowledge graph is provided. The system includes: an apparatus configured to generate a to-be-queried version number associated with version information input by a user; an apparatus configured to receive, from a database storing incremental data of different version numbers, incremental data that are of a version not greater than the to-be-queried version number and closest to the to-be-queried version number and that are output based on the to-be-queried version number, where each of the different version numbers is associated with a time at which corresponding incremental data are obtained; and an apparatus configured to generate full data corresponding to the to-be-queried version number based on the received incremental data.

In still another aspect, a system for querying full data of a knowledge graph is provided. The system includes: an apparatus configured to generate an interval of a to-be-queried version number associated with a version information interval input by a user; an apparatus configured to receive, from a database storing incremental data of different version numbers, first incremental data of a version not greater than a first version number and closest to the first version number and all other incremental data located within the interval that are output based on the first version number with an earliest time in the interval of the to-be-queried version number, where each of the different version numbers is associated with a time at which corresponding incremental data are obtained; and an apparatus configured to generate full data corresponding to each to-be-queried version number in the interval based on the first incremental data and all the other incremental data that are received.

In still another aspect, a non-transient computer-readable storage medium storing instructions is provided. When the instructions are executed by a computer, the computer is enabled to perform the method in any one of the above-mentioned aspects.

The solutions in the embodiments of this specification can provide at least one or more of the following advantages:

1. A multi-version mechanism of the knowledge graph is implemented.

2. A problem of data redundancy and expansion is alleviated, and invalid storage of data is reduced.

3. Storage, construction, and query efficiency are improved.

The summary is provided to describe some concepts in a simplified form. These concepts are further described in the following embodiments. The summary is neither intended to identify crucial features or essential features of the claimed subject matter nor is intended to limit the scope of the claimed subject matter. Other aspects, features, and/or advantages of the embodiments are partially set forth in the following description, and are partially clear from the description, or can be determined through practice of this disclosure.

BRIEF DESCRIPTION OF DRAWINGS

To understand in detail the method in which the above-mentioned features are used, more detailed description of the briefly summarized content can be provided with reference to various embodiments, and some aspects are shown in the accompanying drawings. However, it is worthwhile to note that the accompanying drawings show only some typical aspects of the various embodiments. Therefore, it should not be considered that the scope of the embodiments is limited, as the description can allow for other equally effective aspects. In the accompanying drawings, similar reference numerals are always used for similar identification. It is worthwhile to note that the described accompanying drawings are merely examples and are non-limiting. In the accompanying drawings, sizes of some components can be enlarged and not drawn to scale for illustrative purposes.

FIG. 4 illustrates an example of a process flow for constructing multi-version data of a knowledge graph according to embodiments of this specification;

FIG. 5 illustrates an example of a method for querying full data of a knowledge graph according to embodiments of this specification;

FIG. 6 illustrates an example of another method for querying full data of a knowledge graph according to embodiments of this specification;

DESCRIPTION OF EMBODIMENTS

Figure 1:
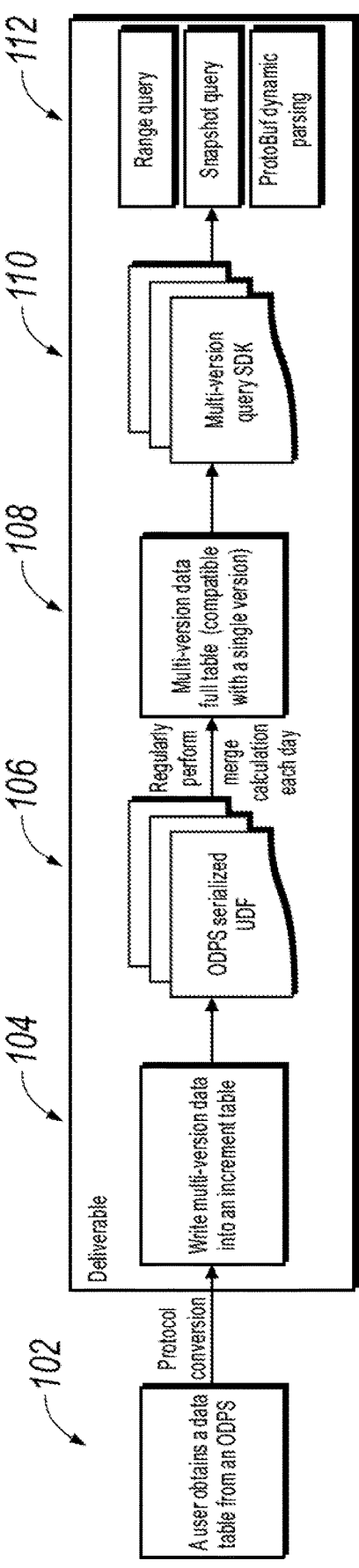
FIG. 1 illustrates an example of a method for constructing multi-version data of a knowledge graph according to embodiments of this specification.

In the following detailed description, numerous specific details are set forth to provide a thorough understanding of the described example embodiments. However, it is clear to a person skilled in the art that the described embodiments can be practiced without some or all of these specific details. In other example embodiments, known structures or processing steps are not described in detail to avoid unnecessarily obscuring the concepts of the embodiments of this description.

In this specification, unless otherwise stated, the term "A or B" used in this specification means "A and B" and "A or B", and does not mean that A and B are exclusive.

A knowledge graph (KG) is a knowledge repository for representing and/or inferring data by using a data model or topology of a graph structure. The knowledge graph is commonly used to represent an entity and a relationship between entities. The entity can include an object, an event, a situation, or a concept.

Most knowledge graphs are usually represented by nodes and edges. The node is also referred to as a vertex, and represents the entity described above. The edge represents a relationship between entities. The edge can be directed or undirected. In a directed knowledge graph, in some representations, a node at the start of an edge can be referred to as a "subject", a label of the edge can be referred to as a "predicate", and a node at the end of the edge can be referred to as an "object". The subject, the predicate, and the object jointly form representations of the nodes and a relationship between the nodes.

The knowledge graph can correspond to data defining ontologies such as an entity and a relationship between entities included in the knowledge graph, to represent semantic information of the ontologies in the knowledge graph. The data can be referred to as a "schema" of the knowledge graph. In some embodiments, the schema of the knowledge graph can include an entity field used to define the entity. The entity field can be understood as an entity name or an entity representation. For example, the entity field can be "company", "name", "credit card", etc. A value of the entity field can be an entity instance described above, for example, company P, Zhang San, a credit card of bank Q, etc. Each entity field can correspond to a plurality of attribute (key) fields. The attribute field can be an abstract or upper-level concept of entity description information. For example, the attribute field can be "position", "registered capital", "age", etc. A value of the attribute field can be specific description of an entity instance corresponding to the attribute field, for example, "manager", "1 million", "28 years old", etc. In some embodiments, the schema of the knowledge graph can further include relationship description used to define the relationship between entities. The relationship description can be an abstract concept of a type of the relationship between entities, for example, an "employment relationship", an "upstream and downstream company relationship", a "kinship relationship", etc. By using the relationship description, it can be determined, when a knowledge picture is constructed, whether there is an edge between two entity instances.

In many service scenarios, users need to query and compare historical data of data of a knowledge graph, to obtain snapshot information at a specified time. For example, a label of gambler may be removed over time and becomes a non-gambler. For example, a relationship of the user can be gradually increased or deleted over time. The user can bind bank card B1 at a moment T1, and can bind bank card B2 at a moment T2, and such relationship changes over time. During learning training, a sub-graph and an attribute of a training sample at a moment T need to be obtained as features. Otherwise, time travel may occur. In an event inference scenario, expected prediction of an event-affected enterprise depends on both an enterprise legal person relationship and an upstream and downstream relationship of ALIPAY. The two pieces of data are fully updated on a monthly basis, that is, one piece of snapshot data is stored every month. The snapshot data mean that knowledge is processed and stored in a snapshot mode. That is, when data are stored and queried by using a timestamp version number, a data snapshot at a timestamp moment T can be output, and includes full data at the moment T. During each event inference, a snapshot corresponding to an event occurrence moment T needs to be used for inference to prevent time travel. In the above-mentioned scenario, a daily data volume is at a level of hundreds of millions, and a very large amount of storage space is occupied. If a service needs data from 90 days ago, there is a huge problem of expansion of stored data, and there may be further version loss, resulting in data inaccuracy.

Therefore, this specification provides methods, apparatuses, and systems for constructing multi-version data of a knowledge graph, which have advantages of effectively alleviating a problem of data redundancy and expansion, reducing invalid storage of data, alleviating a problem of multi-version storage of long life cycle data, implementing mechanisms such as a custom version granularity, a time-to-live (TTL), and a maximum quantity of versions, alleviating a problem of version integrity of a service such as a real-time event, implementing custom version storage of data, and the like.

This specification includes three aspects: multi-version construction of a graph, multi-version storage of a graph, and multi-version query of a graph, which are separately described below.

FIG. 1 illustrates an example of a method for constructing and storing multi-version data of a knowledge graph according to embodiments of this specification.

In embodiments of this specification, the method for multi-version construction of a graph includes: During data construction, for full data, there is conversion from calculation of the full data to calculation of incremental data, and only the incremental data are stored, to greatly reduce data storage.

As described with reference to step 102 in FIG. 1, a data table can be obtained from, for example, an open data processing service (ODPS), at a specified time. The data table can be or can include full data associated with the specified time. In embodiments of this specification, the data table can be periodically obtained based on a time granularity. For example, depending on an update frequency of historical data, the data table can be automatically and regularly obtained at a time granularity such as on a daily basis (for example, at 6:00 a.m. or 12:00 p.m. each day), every other day (for example, an even date or an odd date), on a weekly basis (for example, every Monday or Saturday), on a monthly basis (for example, the first or last day of each month), or only on a working day. Additionally or alternatively, the time granularity can be set by a system. Additionally or alternatively, an instruction can be sent to a system as needed, to trigger an operation of obtaining the data table. For example, if the time granularity is 1 month, when it is known that specific data change, an instruction can be sent to the system on a certain day in the 1 month, to trigger an operation of obtaining a new data table. Additionally or alternatively, the data can be preprocessed as needed to remove noise. For example, missing or redundant data are preprocessed. A preprocessing method is a technical means well known to a person skilled in the art. In embodiments of this specification, step 102 can be specifically implemented by a data acquisition module 510 (see FIG. 5), as described in more detail below.

Subsequently, in step 104, incremental data of the full data at the specified time relative to previous full data obtained at a previous time granularity of the specified time can be calculated, a node and an edge of the knowledge graph that are associated with the incremental data can be dynamically mapped by using a protocol, and the incremental data can be stored with reference to a version number generated based on the specified time. In embodiments of this specification, step 104 can be specifically implemented as follows: A data comparison module 720 calculates the incremental data, a version number generation module 730 generates the version number, a protocol mapping module 740 performs the dynamic mapping, and a storage module 750 stores the incremental data.

In embodiments of this specification, the calculating incremental data can include: comparing a snapshot of the currently obtained full data with a snapshot of the full data obtained at the previous time granularity of the specified time to determine the current incremental (def) data. The snapshot of the full data obtained at the previous time granularity can be generated by querying incremental data of a previous time granularity version. A query method is further described below with reference to FIG. 2. A method for calculating the incremental data can include, for example, obtaining the stored full data M of the previous time granularity version by querying the snapshot of the previous time granularity version from multi-version data, and comparing the full data M with the current newly added full data L (for example, the full data obtained from the ODPS) in terms of attribute granularities one by one. If there are data DATA1 in M and the data DATA1 do not exist in L, the data are marked as deleted. If there are no data DATA2 in M and the data DATA2 exist in L, the data are marked as added. If there are data DATA3 in both M and L, but some attributes of the data DATA3 are modified, the data are marked as updated. If data in M are exactly the same as data in L, the data are ignored. In embodiments of this specification, the calculated incremental data include data marked as deleted, data marked as added, and data marked as updated.

In embodiments of this specification, when there is conversion from calculation of the full data to calculation of the incremental data, the node and the edge of the knowledge graph that are associated with the incremental data are dynamically mapped by using the protocol, and the version number is calculated and stored with reference to the multi-version data, to implement a SPOT (Subject-Predicate-Object-Time) multi-version mechanism of a node and an edge of the knowledge graph. In embodiments of this specification, the SPOT multi-version mechanism means that a concept of time is added to SPO to implement multi-version storage. For example, the version number can be defined as a timestamp of a current moment at which data are obtained. If a first version of data is successfully obtained at 6:00 a.m. on Mar. 1, 2022, and indicates that user A binds credit card B1 of bank Q1, a processor can obtain a current timestamp (for example, a UNIX system timestamp) recorded in the system, and record the version number as 20220301060000. In this case, SPOT data can be illustratively shown as "user A-binding-credit card B1 of bank Q1-20220301060000". Similarly, if a second version of data is successfully obtained at 6:00 a.m. on Mar. 5, 2022, and indicates that user A binds credit card B2 of bank Q1, the version number is recorded as 20220305060000. In this case, SPOT data can be illustratively shown as "user A-binding-credit card B2 of bank Q1-20220305060000", and incremental information of the second version of data can be illustratively shown as "credit card B2 of bank Q1-20220305060000". In this case, a relationship between the "user A" and the "binding" does not need to be stored. Therefore, a large quantity of storage resources are saved. Additionally or alternatively, the version number can alternatively be an index relative to an initial version number. For example, the initial version number can be a version number corresponding to data stored at 6 a.m. on Jan. 1, 2022, and the index of the initial version number is recorded as 0. When data are obtained and stored once a day, an index of a version number of data obtained at 6 a.m. on month X day Y, 2022 is recorded as a positive integer N, and a value of N is a quantity of days from Jan. 1, 2022 to month X day Y, 2022. Continuing with the above-mentioned example, when the version number is recorded as an index, the incremental information of the second version of data on Mar. 5, 2022 can be illustratively shown as "credit card B2 of bank Q1-64", where 64 is a quantity of days from Jan. 1, 2022 to Mar. 5, 2022. It should be understood that the timestamp and the version index are merely shown as examples, and the version number in embodiments of this specification can further include other representations well known to a person skilled in the art.

Subsequently, in step 106, point and edge conversion can be performed by using a serialized user-defined function UDF, and a custom version granularity, a time-to-live (TTL), a maximum quantity of versions, multi-version data merging, and the like are implemented. In embodiments of this specification, the serialized user-defined function UDF can include a user-defined dynamic ProtoBuf protocol.

In embodiments of this specification, a SPOT multi-version storage method can include: implementing storage by using the dynamic ProtoBuf protocol. A conventional ProtoBuf protocol is fixed, but an attribute of a schema in the graph dynamically changes. Therefore, in the SPOT multi-version storage, dynamic mapping storage of the dynamic schema of the graph is alleviated by using the dynamic ProtoBuf protocol. For example, in the dynamic ProtoBuf protocol, an array object of the attribute can be dynamically generated based on information about the schema, to reduce invalid storage of originally fixed data in the conventional ProtoBuf protocol, and effectively alleviate a problem of data redundancy and expansion. For example, continuing with the above-mentioned example, the first version of data is successfully obtained at 6:00 a.m. on Mar. 1, 2022, and indicates that user A binds bank card B1 of bank Q1, and does not bind a credit card of bank Q2, and user C binds bank card B3 of bank Q1, and binds credit card B4 of bank Q2. In this case, data to be stored in the conventional ProtoBuf protocol are "credit card B2 of bank Q1-credit card of bank Q2 NULL-20220305010000" for user A, and are "credit card B3 of bank Q1-credit card B4 of bank Q2-20220305010000" for user B. However, in the dynamic ProtoBuf protocol, only "credit card B2 of bank Q1-20220305010000" can be stored for user A, where NULL indicates null data, and the null data do not need to be stored in the dynamic ProtoBuf protocol. In addition, the attribute of the schema of the knowledge graph can be further "dictionary-encoded" by using the dynamic ProtoBuf protocol, to cancel storage of the attribute key, so that the stored incremental data do not need to include the attribute, to further compress data storage. In embodiments of this specification, the "dictionary encoding" can be creating a "dictionary" by using repeatability of data based on input data to be compressed. The "dictionary" can be a combination of any characters (for example, attributes in this application). In a data encoding process, when encountering a "character" already appearing in the "dictionary", an encoder can output an "index number" of a phrase in the "dictionary" instead of the character. It should be understood that other dictionary encoding methods well known to a person skilled in the art can be used. For example, continuing with the above-mentioned example, it is known that the incremental information of the second version of data can be illustratively shown as "credit card B2 of bank Q1-20220305060000" after being dynamically mapped. After the incremental information of the second version of data is dictionary-encoded, the incremental information can be illustratively stored as "B2-20220305060000", and the attribute "credit card of bank Q1" does not need to be stored (as described below in more detail with reference to a point storage protocol and an edge storage protocol of the knowl- edge graph). It should be understood that the above-men- tioned embodiments are merely for example purposes, and are not intended to limit in any way a form of a protocol for implementing mapping storage of the dynamic schema of the graph by using the dynamic ProtoBuf protocol.

Optionally, a point storage protocol for storing the multi- version data of the knowledge graph by using the dynamic ProtoBuf protocol can be shown below.

---

Point storage protocol-method 1:

```
//all information of a point
message NodeVersionData {
    //all attributes, multi-version information
    VersionData versionData=1;
    //type
    string labels=2;
    //dynamically assembled during runtime and not stored
    //string label=3;
}
//all version information of a point
message VersionData {
    //array object of the attribute that is dynamically generated based on the
information about the schema
    repeated DoubleVersionData id=1;
    repeated StringVersionData name=2;
    repeated StringVersionData xxxx=3;
    Repeated ...
}
//set corresponding object information based on the type (String, Double,
Float, Long)
//record a version number and a corresponding value
message DoubleVersionData {
    int64 version=1;
    double value=2;
}
message FloatVersionData {
    int64 version=1;
    float value=2;
}
...
```

---

In the point storage protocol, attribute information of a variable dynamic schema of a point is dynamically mapped and dictionary-encoded by using the dynamic ProtoBuf protocol, so that the attribute key does not need to be stored. In the point storage protocol, a point has a plurality of versions at an attribute granularity, and the point storage protocol sets repeated in an attribute such as the array object DoubleVersionData to represent a plurality of versions stored in the array type. For example, at a moment T1, an entity field "name" has a value "Zhang San", and a first attribute "age" and a second attribute "position" of the entity field respectively have values "28" and "manager". In a conventional storage method, a field "name (Zhang San)-age (28)-position (manager)" needs to be stored. However, in embodiments of the specification, field space named a "dictionary" can be obtained through dynamic mapping by using the PB protocol. For example, first field space (index 1) is set as "name" field space, second field space (index 2) is set as "age" field space, and third field space (index 3) is set as "position" field space. Correspondingly, when incre- mental data are stored, only "Zhang San-28-manager" (and additionally, the indexes corresponding to the dictionaries) needs to be stored, and the respective attributes "name", "age", "position", and the like do not need to be stored. In this way, after dynamic mapping and dictionary encoding are performed by using the PB protocol, invalid storage of data can be reduced, and data storage can be further com- pressed. In addition, the point storage protocol can further record the version number and/or the corresponding value generated based on the specified time, for example, 20220305060000 and/or the value of the index N. Therefore, the stored data can be "Zhang San-28-manager- 20220305060000" and/or "Zhang San-28-manager-N". It should be understood that the dynamic ProtoBuf further includes encoding and escape operations on the data. The encoding and escape operations are not described here. It is worthwhile to note that the above-mentioned examples are merely intended to provide example and non-limiting expla- nations for the operations of dynamic mapping and diction- ary encoding performed by using the dynamic ProtoBuf.

Optionally, an edge storage protocol for storing the multi- version data of the knowledge graph by using the dynamic ProtoBuf protocol can be shown below.

---

Edge storage protocol-method 1:

```
//all information of an edge
message EdgeVersionData {
    //all version information of an edge, object array
    repeated VersionData versionData=1;
    //service primary key ID
    string sourceId=2;
    string targetId=3;
    //dynamically assembled during runtime and not stored
    //string pType=4;
    //string sType=5;
    //string oType=6;
}
//single version information of an edge
message VersionData {
    int64 version=1;
    DynamicData data=2;
}
//attribute information of an edge that is dynamically generated based on
the information about the schema
message DynamicData {
    string name=1;
    string xxxx=2;
    int64 xxxx=3;
    xxxxx xxxxx=4;
    ...
}
```

---

Similar to that in the point storage protocol, attribute information of a variable dynamic schema of an edge can also be dynamically mapped and dictionary-encoded by using the dynamic ProtoBuf protocol. However, the point storage mechanism and the edge storage mechanism in this specification differ in that an edge has a plurality of versions at a granularity of the edge, and a point has a plurality of versions at an attribute granularity. In the edge storage protocol, the edge protocol sets repeated in the object array VersionData to represent a plurality of versions stored in the array type, and the point protocol sets repeated in an attribute such as the object array DoubleVersionData to represent a plurality of versions stored in the array type. It should be understood that the above-mentioned embodi- ments are merely for example purposes, and are not intended to limit in any way a form of a protocol for implementing mapping storage of the dynamic schema of the graph by using the dynamic ProtoBuf protocol.

Optionally, another edge storage protocol and another point storage protocol for storing the multi-version data of the knowledge graph by using the dynamic ProtoBuf pro- tocol can be shown below.

---

Edge storage protocol-method 2:

---

```
//all information of an edge
message EdgeVersionData {
//all version information of an edge, where the key is int64 and is a ver-
sion
number, and the value is DynamicData and is a dynamic object of an
attribute
    map<int64, DynamicData>versionData=1;
    //service primary key ID
    string sourceId=2;
    string targetId=3;
    //dynamically assembled during runtime and not stored
    //string pType=4;
    //string sType=5;
    //string oType=6;
}
//attribute information of an edge that is dynamically generated based on
the information about the schema
message DynamicData {
    string name=1;
    string xxxx=2;
    int64 xxxx=3;
    xxxxx xxxxx=4;
    ...
}
```

---

---

Point storage protocol-method 2:

---

```
//all information of a point
message NodeVersionData {
    //all version information of a point, where the key is a version number,
and the value is a dynamic object of an attribute
    map<int64, DynamicData>versionData=1;
    //type
    string labels=2;
    //dynamically assembled during runtime and not stored
    //string label=3;
}
//attribute information of a point that is dynamically generated based on
the information about the schema
message DynamicData {
    string name=1;
    string xxxx=2;
    int64 xxxx=3;
    xxxxx xxxxx=4;
    ...
}
```

---

Methods 2 of the edge storage protocol and the point storage protocol are improvements made based on the solutions of methods 1. In methods 2, construction and storage logic is the same as that in methods 1, and improvements are made to the dynamic ProtoBuf protocol. In the solutions of methods 1, the point storage protocol and the edge storage protocol are separated, while in methods 2, a mapping function (for example, map<int64, DynamicData>versionData=1, where int64 represents a version number, and DynamicData represents a dynamic object of an attribute) is used in the protocol to perform dynamic mapping and dictionary encoding by using the dynamic ProtoBuf protocol, so that the point storage protocol and the edge storage protocol are the same.

In embodiments of this specification, after the operations of dynamic mapping and dictionary encoding are performed by using the dynamic ProtoBuf protocol, all historical data and newly added incremental data that are stored can be merged. A merging operation can be performed with reference to the dynamic ProtoBuf protocol, or a merging operation can be performed separately from the dynamic ProtoBuf protocol.

In embodiments of this specification, data merging refers to a merging mode in which knowledge data are processed and stored as incremental data. For example, a large quantity of strategies can be customized in a data merging process, to alleviate problems such as a custom version granularity, a time-to-live (TTL), a maximum threshold quantity of versions, multi-version data merging, and snapshot storage. In embodiments of this specification, all the historical data and the newly added incremental data that are stored can be merged as needed, and a time granularity at which merging is performed is also configurable. For example, data merging can be performed each time there are newly added incremental data, or data merging can be performed at another time granularity (for example, on a daily basis or at a regular time each week).

In embodiments of this specification, data merging can include: storing only each version of incremental data within the time-to-live (TTL). For example, after incremental data with a timestamp are calculated, the system can query whether the earliest stored data fall within the time-to-live (TTL) (for example, 60 days or 90 days), and discard the old data if the earliest stored data fall outside the time-to-live. It should be understood that in embodiments of this specification, the first version of data (or the earliest version of data) is full data. If the first version of data is discarded, the new earliest version of data may need to be converted into full data for storage.

In embodiments of this specification, data merging can include: discarding one or more pieces of incremental data based on a given condition when a quantity of pieces of incremental data reaches a defined maximum threshold quantity. For example, the maximum threshold quantity can be 100, and the give condition can be earliest data, data that include a largest amount of redundant information, data that occupy a largest amount of resource space, etc. Correspondingly, when the quantity of pieces of incremental data reaches the defined maximum threshold quantity, stored incremental data satisfying the condition can be discarded or merged with an adjacent version.

In embodiments of this specification, data merging can include: merging one or more versions of data. For example, data obtained in the morning and afternoon of the same day can be merged, different data from different databases can be merged, and storage of redundant data can be canceled.

Subsequently, in step 108, a plurality of versions of data can be correspondingly stored. In addition, in step 110, multi-version query of the knowledge graph can be performed. The multi-version query of the knowledge graph can include snapshot query and range query, which are further described below with reference to FIG. 2 and FIG. 3.

Figure 2:
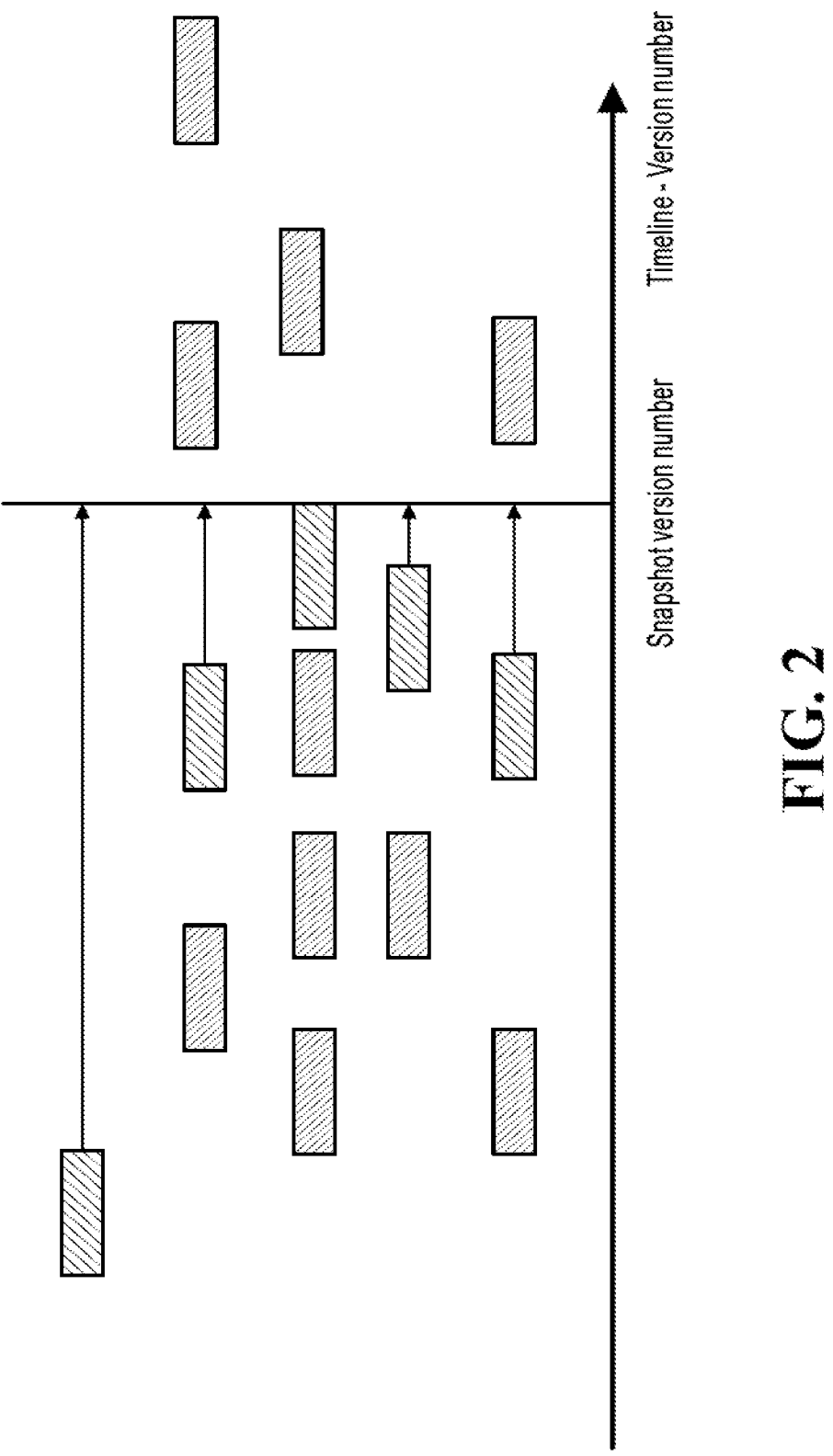
FIG. 2 illustrates an example of a method for performing multi-version query of a graph through snapshot query according to embodiments of this specification.

FIG. 2 illustrates an example of a method for performing multi-version query of a graph through snapshot query according to embodiments of this specification.

In embodiments of this specification, if a plurality of versions of incremental data have been stored with reference to a timestamp version number, when data are queried, a result is a single version of incremental data at a timestamp moment T. In this case, an inverse encoding operation needs to be performed, that is, a dynamic ProtoBuf protocol is inversely parsed to obtain corresponding full data, and the full data can correspond to database snapshot information at a current version number moment. This is because there is conversion from calculation of full data to calculation of incremental data in the construction process described in FIG. 1, storage is performed only when a data version changes, and no data version is newly added if there is no data change. That is, a newly added data version is generated only when data are deleted, added, and updated. Therefore, when snapshot query is performed, only data of a version closest to a snapshot version need to be returned, and then the dynamic ProtoBuf protocol is inversely parsed to obtain corresponding full data. It should be understood that the first version of data is full data, the first version of data exists during cold start, and no logic of conversion from full data to incremental data is needed.

For example, a user may need data on Nov. 1, 2022, and can input a to-be-queried version number 4 or version information. When the version information Nov. 1, 2022 or a corresponding index of the date is input, the to-be-queried version number 4 can be generated based on the version information. For example, with reference to FIG. 2, when version information associated with a snapshot version number (Long version) is input, lighter colored content (single piece of incremental data) in FIG. 2 can be returned. Further, references can be made to example 1, as shown in the following table:

| Input (version number) | Version data | Output |
|---|---|---|
| Version number = 4 | {2: "v2"} | v2 |
| | {1: "v1", 2: "v2", 3: "v3", 5: "v5"} | v3 |
| | {1: "v1", 2: "v2", 3: "v3", 4: "v4", 5: "v5", 7: "v7"} | v4 |
| | {4: "v4", 5: "v5", 6: "v6", 7: "v7"} | v4 |
| | {1: "v1", 2: "v2", 5: "v5", 7: "v7"} | v2 |

It can be seen from the table that when the version number 4 is input, relative to the version data {2: "v2" } in which a first attribute is stored, a version not greater than the version number 4 and closest to the version number is v2, and therefore the single version of incremental data v2 is output; relative to the version data {1: "v1", 2: "v2", 3: "v3", 5: "v5" } in which a second attribute is stored, a version not greater than the version number 4 and closest to the version number is v3, and therefore the single version of incremental data v3 is output; relative to the version data {1: "v1", 2: "v2", 3: "v3", 4: "v4", 5: "v5", 7: "v7" } in which a third attribute is stored, a version not greater than the version number 4 and closest to the version number is v4, and therefore the single version of incremental data v4 is output; and so on.

Therefore, a query method can include: generating a to-be-queried version number associated with version information input by a user; outputting, based on the to-be-queried version number, incremental data not greater than the to-be-queried version number and closest to the to-be-queried version number; and generating full data corresponding to the to-be-queried version number based on the incremental data. Optionally, the full data are displayed in a form of database snapshot information. In embodiments of this specification, inverse encoding needs to be performed to generate the to-be-queried data based on the incremental data, that is, the dynamic ProtoBuf protocol needs to be inversely parsed. For example, a system can query an attribute corresponding to the incremental data, perform inverse mapping (for example, includes "inverse" dictionary encoding) on the attribute, and finally display data in a form of database snapshot information.

Figure 3:
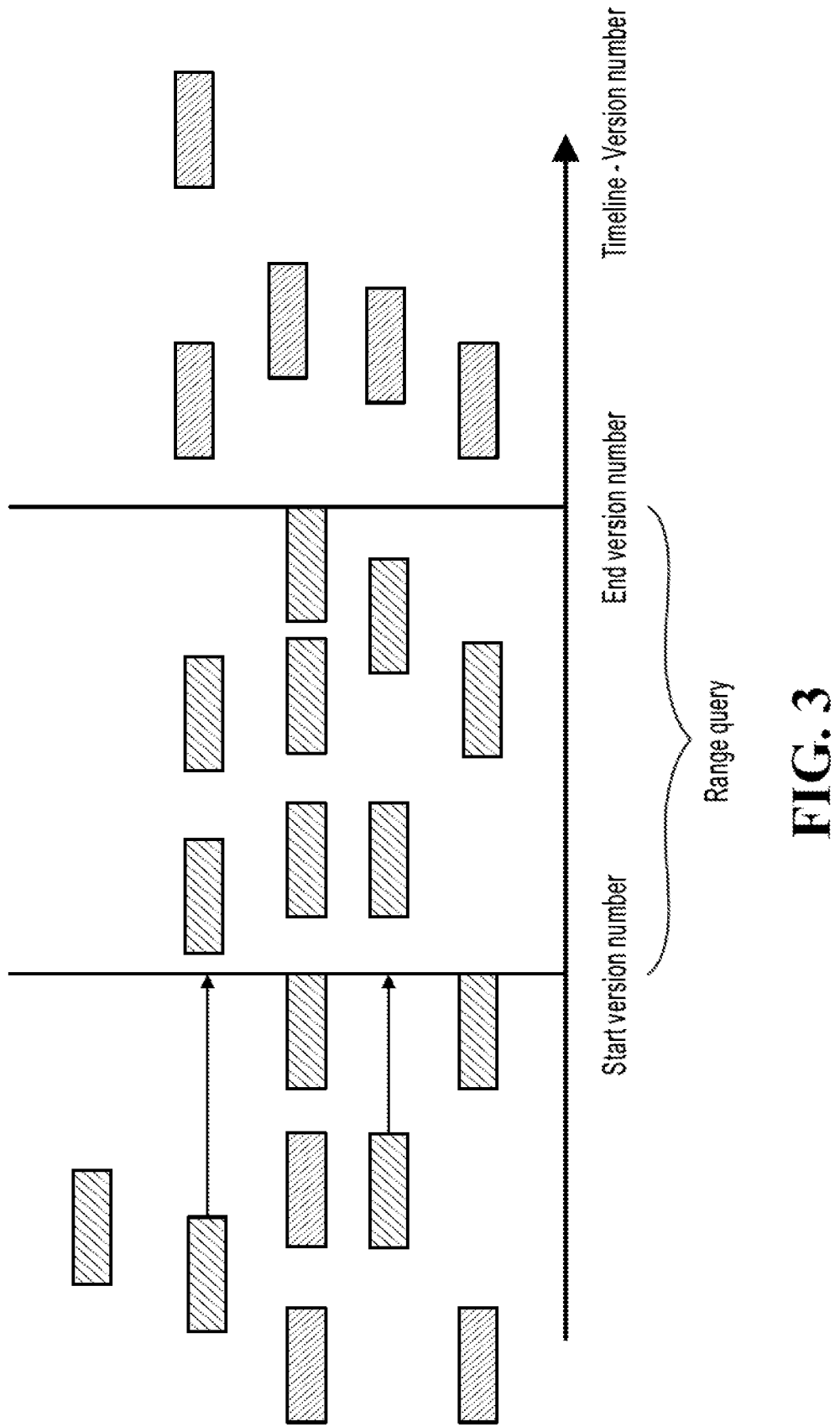
FIG. 3 illustrates an example of a method for performing multi-version query of a graph through range query according to embodiments of this specification.

FIG. 3 illustrates an example of a method for performing multi-version query of a graph through range query according to embodiments of this specification.

In embodiments of this specification, the range query (Window) can include: querying version information (a version number, a timestamp, a version index, or the like) in a certain range interval and returning data. As shown in FIG. 3, when a start version number and an end version number are input, lighter colored content (corresponding incremental data of each version) in the figure is returned.

For example, a user needs to query data in a range from Nov. 1, 2022 to Nov. 5, 2022. In this case, the user obtains a version number corresponding to Nov. 1, 2022, performs snapshot query, and then obtains all other version information in the range from Nov. 1, 2022 to Nov. 5, 2022. A to-be-queried version number includes a start version number (Long startVersion) 2 corresponding to Nov. 1, 2022 and an end version number (Long endVersion) 6 corresponding to Nov. 5, 2022. Further, references can be made to example 2, as shown in the following table:

| Input | Version data | Output |
|---|---|---|
| Start version number = 2 End version number = 6 | {2: "v2"} {1: "v1", 3: "v3", 5: "v5"} | {2: "v2"} {3: "v3", 5: "v5"} |
| | {1: "v1", 3: "v3", 4: "v4", 5: "v5", 7: "v7"} | {3: "v3", 4: "v4", 5: "v5"} |
| | {4: "v4", 5: "v5", 6: "v6", 7: "v7"} | {4: "v4", 5: "v5", 6: "v6"} |
| | {1: "v1", 2: "v2", 5: "v5", 7: "v7"} | {2: "v2", 5: "v5"} |

It can be seen from the table that when the start version number 2 and the end version number 6 are input, relative to the version data {2: "v2" } in which a first attribute is stored, a version not greater than the version number 2 and closest to the version number is v2, and there are no other incremental data before the end version number=6, and therefore a group of data, namely, the version number 2 and the incremental data v2 corresponding to the version number 2, is output; relative to the version data {1: "v1", 3: "v3", 5: "v5" } in which a second attribute is stored, a version not greater than the version number 6 and closest to the version number is v5, and therefore two groups of data, namely, the version number 3 and the incremental data v3 corresponding to the version number 3 and the version number 5 and the incremental data v5 corresponding to the version number 5, are output; similarly, relative to the version data {1: "v1", 3: "v3", 4: "v4", 5: "v5", 7: "v7" } in which a third attribute is stored, a version not greater than the version number 2 and closest to the version number is v3, and a version not greater than the version number 6 and closest to the version number is v5, and therefore three groups of data, namely, the version number 2 and the incremental data v3 corresponding to the version number 3, the version number 5 and the incremental data v5 corresponding to the version number 5, and the version number 4 between the version number 3 and the version number 5 and the incremental data v4 corresponding to the version number 4, are output; and so on.

Therefore, a range query method can include: generating an interval of a to-be-queried version number associated with a version information interval input by a user; outputting, based on a first version number with an earliest time in the interval of the to-be-queried version number, first incremental data not greater than the first version number and closest to the first version number and all other incremental data located within the interval; and generating full data corresponding to each to-be-queried version number in the interval based on the first incremental data and all the other incremental data. Similarly, in embodiments of this specification, inverse encoding needs to be performed to generate the to-be-queried data based on the incremental data, that is, a dynamic ProtoBuf protocol needs to be inversely parsed. For example, a system can query, in a "dictionary", an attribute corresponding to the incremental data, perform inverse mapping (for example, includes "inverse" dictionary encoding) on the attribute, and finally display each version of data in a form of database snapshot information.

FIG. 4 illustrates an example of a method 400 for a process flow for constructing multi-version data of a knowledge graph according to embodiments of this specification.

The method 400 can include: Full data of the knowledge graph can be obtained at a specified time in operation 410. The operation can be similar to that described with reference to step 102 in FIG. 1. A data table is periodically obtained based on a time granularity, or an instruction is sent to a system when needed to trigger acquisition of a data table. Optionally, the time granularity is configurable. Optionally, operation 410 can be specifically implemented by a data acquisition module 710, as described in more detail below.

The method 400 can further include: Incremental data of the full data relative to full data obtained at a previous time granularity can be calculated in operation 420. The operation can be similar to that described with reference to step 104 in FIG. 1. A snapshot of the currently obtained full data is compared with a snapshot of the full data obtained at the previous time granularity of the specified time. When there are first data in the full data and the first data do not exist in the full data obtained at the previous time granularity, the first data are marked as added; when there are no second data in the full data and the second data exist in the full data obtained at the previous time granularity, the second data are marked as deleted; when there are third data in both the full data and the full data obtained at the previous time granularity, but some attributes of the third data are modified, the third data are marked as updated; and when fourth data in the full data are exactly the same as fourth data in the full data obtained at the previous time granularity, the fourth data are ignored, where the first data, the second data, the third data, and the fourth data are different data, and the incremental data include the first data, the second data, and the third data. Optionally, operation 420 can be specifically implemented by a data comparison module 720, as described in more detail below.

The method 400 can further include: A version number of the incremental data can be generated at least partially based on the specified time in operation 430. The operation can be similar to that described with reference to step 104 in FIG. 1. A timestamp of a current moment of the data or an index relative to an initial version number is obtained. Optionally, operation 430 can be specifically implemented by a version number generation module 730, as described in more detail below.

The method 400 can further include: A node and an edge of the knowledge graph that are associated with the incremental data can be dynamically mapped by using a protocol in operation 440. The protocol can be a dynamic ProtoBuf protocol. The operation can be similar to that described with reference to step 104 in FIG. 1. A schema of the incremental data is dynamically mapped by using the dynamic ProtoBuf protocol (for example, method 1), to compress a large amount of storage. Optionally, operation 440 can be specifically implemented by a protocol mapping module 740, as described in more detail below.

The method 400 can further include: The incremental data can be stored with reference to the version number in operation 450. The operation can be similar to that described with reference to step 104 in FIG. 1. The version number of the incremental data is stored with reference to the incremental data. Optionally, operation 450 can be specifically implemented by a storage module 750, as described in more detail below.

Optionally, the method 400 can further include: An attribute of a schema of the knowledge graph is dictionary-encoded after the dynamic mapping, so that the stored incremental data do not need to include the attribute. The operation can be similar to that described with reference to step 104 in FIG. 1. The attribute of the schema of the knowledge graph is further dictionary-encoded by using the dynamic ProtoBuf protocol (for example, method 1), to cancel storage of the attribute key, so that the stored incremental data do not need to include the attribute, to reduce invalid data storage. Optionally, the operation can be specifically implemented by a protocol mapping module.

Optionally, the method 400 can further include: An attribute of a schema of the knowledge graph is dictionary-encoded when the dynamic mapping is performed, so that the stored incremental data do not need to include the attribute. The operation can be similar to that described with reference to step 104 in FIG. 1. A schema of the incremental data is further dynamically mapped, and the attribute of the schema of the knowledge graph is further dictionary-encoded, by using a dynamic ProtoBuf protocol (for example, method 2) and a mapping function, to cancel storage of the attribute key, so that the stored incremental data do not need to include the attribute. Optionally, the operation can be specifically implemented by a protocol mapping module.

Optionally, the method 400 can further include: All stored incremental data are merged based on at least one of the following: a time-to-live of the incremental data, a maximum threshold quantity of pieces of incremental data, or a combination thereof. The operation can be similar to that described with reference to step 108 in FIG. 1. Each version of incremental data within the time-to-live can be stored; one or more pieces of incremental data can be discarded based on a condition when a quantity of pieces of stored incremental data reaches the maximum threshold quantity; data obtained in the morning and afternoon of the same day can be merged, different data from different databases can be merged, and storage of redundant data can be canceled; and so on. Optionally, the operation can be specifically implemented by a protocol mapping module and a storage module.

FIG. 5 illustrates an example of a method 500 for querying full data of a knowledge graph according to embodiments of this specification.

In the method 500, a single version of full data can be output. In embodiments of this specification, the method 500 can include: generating a to-be-queried version number associated with version information input by a user (510); outputting, based on the to-be-queried version number in a database storing incremental data of different version numbers, incremental data of a version not greater than the to-be-queried version number and closest to the to-be-queried version number, where each of the different version numbers is associated with a time at which corresponding incremental data are obtained (520); and generating full data corresponding to the to-be-queried version number based on the output incremental data (530). The operations in the method 500 can be similar to the various steps described with reference to the snapshot query in FIG. 2. If a plurality of versions of incremental data have been stored with reference to a timestamp version number, when data are queried, version information is input, and an output result is a single version of incremental data at a timestamp moment T. The version information includes a to-be-queried time-stamp, an index of the to-be-queried version number, or the like. Optionally, the operation can be specifically implemented by a query module. Additionally or alternatively, the query module can remotely receive the incremental data from the database storing incremental data of different version numbers.

Optionally, the method 500 can further include: when the stored incremental data are dynamically mapped and dictionary-encoded by using a protocol, inversely parsing the protocol to obtain the full data corresponding to the to-be-queried version number. The operation in the method 500 can be similar to that described with reference to the snapshot query in FIG. 2. When the incremental data are dynamically mapped and dictionary-encoded by using a ProtoBuf protocol, the dynamic ProtoBuf protocol needs to be inversely parsed to obtain the corresponding full data. When snapshot query is performed, only data of a version closest to a snapshot version need to be returned, and then the dynamic ProtoBuf protocol is inversely parsed to obtain corresponding full data. Optionally, the operation can be specifically implemented by a query module.

Optionally, the method 500 can further include: displaying database snapshot information at a current version number moment corresponding to the full data. Optionally, the operation can be specifically implemented by a display module.

FIG. 6 illustrates an example of a method 600 for querying full data of a knowledge graph according to embodiments of this specification.

In the method 600, range query can be performed, that is, version information (a version number, a timestamp, a version index, or the like) in a certain range interval is queried and data are returned. In embodiments of this specification, the method 600 can further include: generating an interval of a to-be-queried version number associated with a version information interval input by a user (610); outputting, based on a first version number with an earliest time in a database storing incremental data of different version numbers, first incremental data not greater than the first version number and closest to the first version number and all other incremental data located within the interval, where each of the different version numbers is associated with a time at which corresponding incremental data are obtained (620); and generating full data corresponding to each to-be-queried version number in the interval based on the first incremental data and all the other incremental data that are output (630). The operations can be similar to the various steps described with reference to the range query in FIG. 3. Optionally, the operation can be specifically implemented by a query module. Additionally or alternatively, the query module can remotely receive the incremental data from the database storing incremental data of different version numbers.

Optionally, similar to the method 500, the method 600 can further include: when the stored incremental data are dynamically mapped and dictionary-encoded by using a protocol, inversely parsing the protocol to obtain the full data of each version corresponding to the interval of the to-be-queried version number. The operation in the method 600 can be similar to that described with reference to the snapshot query in FIG. 2. When the incremental data are dynamically mapped and dictionary-encoded by using a ProtoBuf protocol, the dynamic ProtoBuf protocol needs to be inversely parsed to obtain the corresponding full data of each version. Optionally, the operation can be specifically implemented by a query module.

Optionally, the method 600 can further include: displaying database snapshot information at each version number moment corresponding to the full data. Optionally, the operation can be specifically implemented by a display module.

Figure 7:
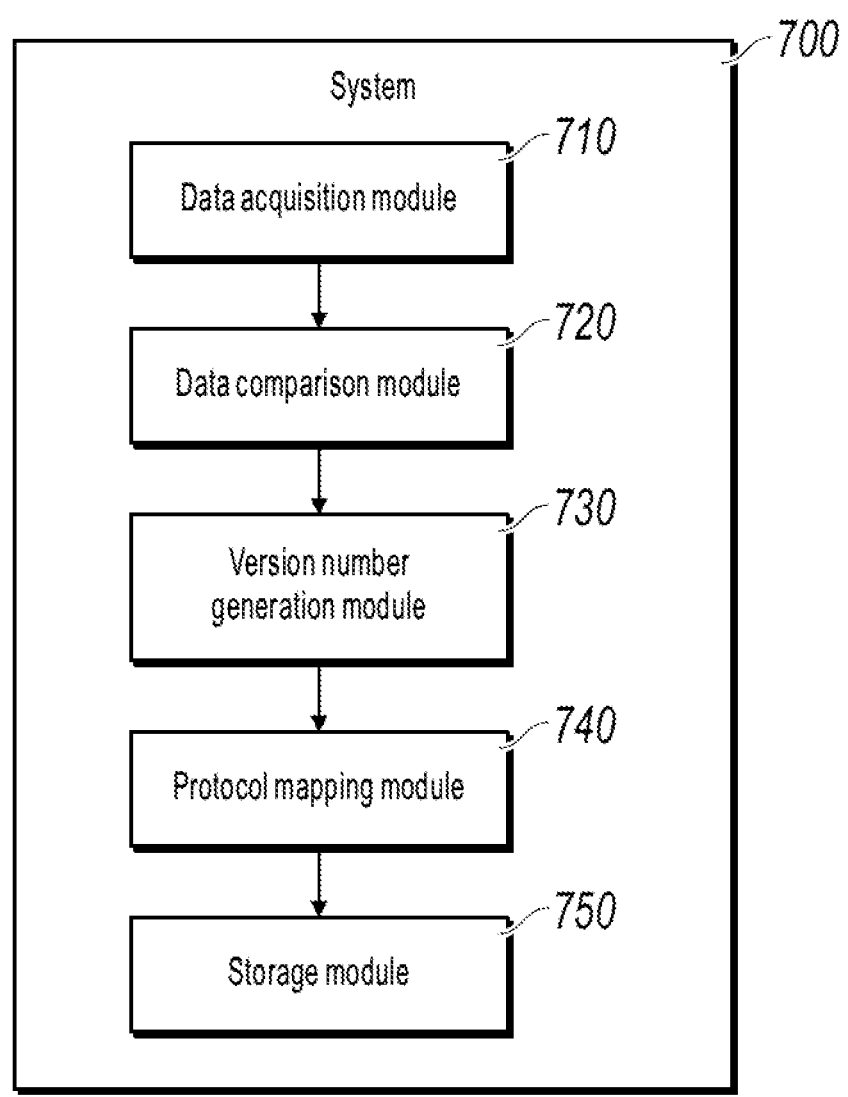
FIG. 7 illustrates a block diagram of a system for constructing multi-version data of a knowledge graph according to embodiments of this specification.

FIG. 7 illustrates a block diagram of a system 700 for constructing multi-version data of a knowledge graph according to embodiments of this specification.

As shown in FIG. 7, the system 700 can include a data acquisition module 710, configured to obtain full data of the knowledge graph at a specified time. An operation implemented by the data acquisition module 710 can be similar to that described with reference to step 102 in FIG. 1. A data table is periodically obtained based on a time granularity, or an instruction is sent to a system when needed to trigger acquisition of a data table. Optionally, the time granularity is configurable.

The system 700 can further include a data comparison module 720, configured to calculate incremental data of the full data relative to full data obtained at a previous time granularity. An operation implemented by the data comparison module 720 can be similar to that described with reference to step 104 in FIG. 1. A snapshot of the currently obtained full data is compared with a snapshot of the full data obtained at the previous time granularity of the specified time to determine the current incremental data.

The system 700 can further include a version number generation module 730, configured to generate a version number of the incremental data at least partially based on the specified time. An operation implemented by the version number generation module 730 can be similar to that described with reference to step 104 in FIG. 1. A timestamp of a current moment of the data or an index relative to an initial version number is obtained.

The system 700 can further include a protocol mapping module 740, configured to dynamically map, by using a protocol, a node and an edge of the knowledge graph that are associated with the incremental data. An operation implemented by the protocol mapping module 740 can be similar to that described with reference to step 104 in FIG. 1. The node and the edge of the knowledge graph that are associated with the incremental data are dynamically mapped by using the protocol, and an attribute of a schema of the knowledge graph is dictionary-encoded after the dynamic protocol, so that the stored incremental data do not need to include the attribute. Additionally or alternatively, the dynamic mapping and the dictionary encoding can be simultaneously implemented by using the ProtoBuf protocol. A specific operation implemented by the protocol mapping module can be similar to that described with reference to step 104 in FIG. 1.

The system 700 can further include a storage module 750, configured to store the incremental data with reference to the version number. Additionally or alternatively, the storage module can be further configured to further merge all stored incremental data based on at least one of a time-to-live of the incremental data, a maximum threshold quantity of pieces of incremental data, or a combination thereof. An operation implemented by the storage module 740 can be similar to that described with reference to step 104 in FIG. 1. The version number of the incremental data is stored with reference to the incremental data.

For specific details of the operations performed by the modules, references can be made to the description of the method. It should be understood that some optional operations can be performed by the modules described above, or can be performed by additional modules.

Optionally, the system 700 can further include a query module (not shown in the figure), configured to: generate a to-be-queried version number associated with version information input by a user; output, based on the to-be-queried version number, incremental data not greater than the to-be-queried version number and closest to the to-be-queried version number; and generate full data corresponding to the to-be-queried version number based on the incremental data. Additionally or alternatively, the query module can be configured to: generate an interval of a to-be-queried version number associated with a version information interval input by a user; output, based on a first version number with an earliest time in the interval of the to-be-queried version number, first incremental data not greater than the first version number and closest to the first version number and all other incremental data located within the interval; and generate full data corresponding to each to-be-queried version number in the interval based on the first incremental data and all the other incremental data. Operations implemented by the query module can be similar to the steps described with reference to the snapshot query in FIG. 2 and the range query in FIG. 3. A system processor can query an attribute corresponding to the incremental data, perform inverse mapping (for example, includes "inverse" dictionary encoding) on the attribute, and finally output data in a form of database snapshot information. Additionally or alternatively, the query module can remotely receive the incremental data from the database storing incremental data of different version numbers.

Optionally, the system 700 can further include a display module (not shown in the figure), configured to display a snapshot or the like of the corresponding full data. Operations implemented by the display module can be similar to the steps described with reference to the snapshot query in FIG. 2 and the range query in FIG. 3. When the incremental data are dynamically mapped and dictionary-encoded by using a ProtoBuf protocol, the system processor can inversely parse the dynamic ProtoBuf protocol to obtain the corresponding full data, and finally display the data on the display module in a form of database snapshot information.

Figure 8:
FIG. 8 illustrates a block diagram of an apparatus for constructing multi-version data of a knowledge graph according to embodiments of this specification.

FIG. 8 illustrates a block diagram of an apparatus 800 for constructing multi-version data of a knowledge graph according to embodiments of this specification.

The apparatus can include a processor 810 and a memory 815. The processor is configured to perform any method described above, for example, the method shown in each figure. The memory can store, for example, an obtained article, information associated with a product or a service, data that can be generated during processing, and necessary algorithms.

The apparatus can include a network connection element 825, for example, can include a network connection device connected to other devices through a wired connection or a wireless connection. The wireless connection can be, for example, a Wi-Fi connection, a Bluetooth connection, or a 3G/4G/5G network connection. For example, an article acquisition module can be connected to an information source through the network connection element, to obtain an article, and can further receive, through the network connection element, an input implemented by a user by using another device, or transmit data to another device for display.

Optionally, the apparatus can further include other peripheral elements 820, for example, an input apparatus (a keyboard or a mouse) and an output apparatus (for example, a display). For example, in a user input-based method, the user can perform an input operation by using the input apparatus, and corresponding information can be further output to the user by using the output apparatus.

All of these modules can directly or indirectly communicate with each other, for example, via one or more buses (for example, a bus 805).

In addition, embodiments of this specification further disclose computer-readable storage media including computer-executable instructions stored in the computer-readable storage media. When the computer-executable instructions are executed by a processor, the processor is enabled to perform the method in the embodiments described in this specification.

In addition, embodiments of this specification further disclose apparatuses. The apparatuses include a processor and a memory storing computer-executable instructions. When the computer-executable instructions are executed by the processor, the processor is enabled to perform the method in the embodiments described in this specification.

In addition, embodiments of this specification further disclose systems. The systems include apparatuses configured to implement the method in the embodiments described in this specification. In an aspect, the systems can include a system for constructing data of a knowledge graph, and the system includes: an apparatus configured to obtain full data of the knowledge graph at a specified time; an apparatus configured to calculate incremental data of the full data relative to full data obtained at a previous time granularity; an apparatus configured to generate a version number of the incremental data at least partially based on the specified time; and an apparatus configured to store the incremental data with reference to the version number. In another aspect, the systems can further include a system for querying full data of a knowledge graph, and the system includes: an apparatus configured to generate a to-be-queried version number associated with version information input by a user; an apparatus configured to receive, from a database storing incremental data of different version numbers, incremental data that are of a version not greater than the to-be-queried version number and closest to the to-be-queried version number and that are output based on the to-be-queried version number, where each of the different version numbers is associated with a time at which corresponding incremental data are obtained; and an apparatus configured to generate full data corresponding to the to-be-queried version number based on the received incremental data. In still another aspect, the systems can include a system for querying full data of a knowledge graph, and the system includes: an apparatus configured to generate an interval of a to-be-queried version number associated with a version information interval input by a user; an apparatus configured to receive, from a database storing incremental data of different version numbers, first incremental data of a version not greater than a first version number and closest to the first version number and all other incremental data located within the interval that are output based on the first version number with an earliest time in the interval of the to-be-queried version number, where each of the different version numbers is associated with a time at which corresponding incremental data are obtained; and an apparatus configured to generate full data corresponding to each to-be-queried version number in the interval based on the first incremental data and all the other incremental data that are received.

The methods, apparatuses, and systems for constructing multi-version data of a knowledge graph according to the embodiments of this specification are described above, and have at least the following advantages over the conventional technology:

1. Unified multi-version construction, storage, and calculation are provided to implement a SPOT multi-version mechanism of a point and an edge.

2. A problem of data redundancy and expansion is effectively alleviated, and invalid storage of data is reduced.

3. A problem of multi-version storage of long life cycle data is alleviated, and a custom version granularity, a time-to-live, a maximum quantity of versions, and the like are implemented.

4. A problem of version integrity of a service such as a real-time event is alleviated, and custom version storage of data is implemented.

It can be understood that the method according to one or more embodiments of this specification can be implemented by software, firmware, or a combination thereof.

It should be understood that the embodiments in this specification are described in a progressive way. For same or similar parts of the embodiments, references can be made to the embodiments mutually. Each embodiment focuses on a difference from other embodiments. Particularly, the apparatus embodiments and the system embodiments are basically similar to the method embodiments, and therefore are described briefly. For related parts, references can be made to partial description in the method embodiments.

It should be understood that specific embodiments of this specification are described above. Other embodiments fall within the scope of the appended claims. In some cases, the actions or steps described in the claims can be performed in a sequence different from that in the embodiments, and the desired results can still be achieved. In addition, the process depicted in the accompanying drawings does not necessarily need a particular execution sequence to achieve the desired results. In some implementations, multi-tasking and concurrent processing is feasible or may be advantageous.

It should be understood that an element described in this specification in a singular form or shown as one element in the accompanying drawings does not mean that a quantity of elements is limited to one. In addition, modules or elements described or shown in this specification as separate can be combined into a single module or element, and modules or elements described or shown in this specification as single modules or elements can be split into a plurality of modules or elements.

It should be further understood that the terms and expressions used in this specification are merely used for description, and one or more embodiments of this specification should not be limited to these terms and expressions. Use of these terms and expressions does not mean that equivalent features of any example and description (or a part thereof) are excluded, and it should be understood that various modifications that may exist also fall within the scope of the claims. There may be other modifications, changes, and replacements. Correspondingly, the claims should be considered as covering all these equivalents.

Similarly, it is worthwhile to note that although description is provided with reference to the current specific embodiments, it should be understood by a person of ordinary skill in the art that the above-mentioned embodiments are merely intended to describe one or more embodiments of this specification, and various equivalent changes or replacements can be made without departing from the spirit of the embodiments of this specification. Therefore, any changes or variations to the above-mentioned embodiments made without departing from the spirit and scope of this specification shall fall within the scope of the claims of this specification.

What is claimed is:

1. A computer-implemented method for constructing knowledge graph data, comprising:
   obtaining full data of a knowledge graph at a specified time;
   calculating incremental data of the full data relative to full data obtained at a previous time granularity;
   generating a version number of the incremental data at least partially based on the specified time;
   dynamically mapping, by using a protocol and as a dynamic mapping, a node and an edge of the knowledge graph that are associated with the incremental data; and
   storing, as stored incremental data, the incremental data with reference to the version number.

2. The computer-implemented method of claim 1, comprising:
   dictionary-encoding an attribute of a schema of the knowledge graph by using the protocol after the dynamic mapping, so that the stored incremental data does not need to comprise the attribute.

3. The computer-implemented method of claim 1, comprising:
   dictionary-encoding an attribute of a schema of the knowledge graph when performing the dynamic mapping, so that the stored incremental data does not need to comprise the attribute.

4. The computer-implemented method of claim 1, comprising:
   merging all the stored incremental data based on at least one of: 1) a time-to-live of the incremental data, 2) a maximum threshold quantity of pieces of incremental data, or 3) a combination thereof.

5. The computer-implemented method of claim 4, comprising:
   storing each version of incremental data within the time-to-live.

6. The computer-implemented method of claim 4, comprising:
   discarding one or more pieces of incremental data when a quantity of pieces of stored incremental data reaches the maximum threshold quantity of pieces of incremental data.

7. The computer-implemented method of claim 1, wherein the specified time is periodically triggered based on a time granularity at which the full data is obtained.

8. The computer-implemented method of claim 7, wherein the time granularity is configurable.

9. The computer-implemented method of claim 1, wherein calculating the incremental data, comprises:
   when there is first data in the full data and the first data does not exist in the full data obtained at the previous time granularity, marking the first data as added; and
   when there is no second data in the full data and the second data exists in the full data obtained at the previous time granularity, marking the second data as deleted.

10. The computer-implemented method of claim 9, comprising:
   when there is third data in both the full data and the full data obtained at the previous time granularity, but some attributes of the third data are modified, marking the third data as updated; and
   when fourth data in the full data is identical to fourth data in the full data obtained at the previous time granularity, ignoring the fourth data, wherein the first data, the second data, the third data, and the fourth data are different data, and the incremental data comprises the first data, the second data, and the third data.

11. A non-transitory, computer-readable medium storing one or more instructions executable by a computer system to perform operations, comprising:

obtaining full data of a knowledge graph at a specified time;

calculating incremental data of the full data relative to full data obtained at a previous time granularity;

generating a version number of the incremental data at least partially based on the specified time;

dynamically mapping, by using a protocol and as a dynamic mapping, a node and an edge of the knowledge graph that are associated with the incremental data; and storing, as stored incremental data, the incremental data with reference to the version number.

12. The non-transitory, computer-readable medium of claim 11, comprising:

dictionary-encoding an attribute of a schema of the knowledge graph by using the protocol after the dynamic mapping, so that the stored incremental data does not need to comprise the attribute.

13. The non-transitory, computer-readable medium of claim 11, comprising:

dictionary-encoding an attribute of a schema of the knowledge graph when performing the dynamic mapping, so that the stored incremental data does not need to comprise the attribute.

14. The non-transitory, computer-readable medium of claim 11, comprising:

merging all the stored incremental data based on at least one of: 1) a time-to-live of the incremental data, 2) a maximum threshold quantity of pieces of incremental data, or 3) a combination thereof.

15. The non-transitory, computer-readable medium of claim 14, comprising:

storing each version of incremental data within the time-to-live.

16. The non-transitory, computer-readable medium of claim 14, comprising:

discarding one or more pieces of incremental data when a quantity of pieces of stored incremental data reaches the maximum threshold quantity of pieces of incremental data.

17. The non-transitory, computer-readable medium of claim 11, wherein the specified time is periodically triggered based on a time granularity at which the full data is obtained.

18. The non-transitory, computer-readable medium of claim 17, wherein the time granularity is configurable.

19. The non-transitory, computer-readable medium of claim 11, wherein calculating the incremental data, comprises:

when there is first data in the full data and the first data does not exist in the full data obtained at the previous time granularity, marking the first data as added;

when there is no second data in the full data and the second data exists in the full data obtained at the previous time granularity, marking the second data as deleted;

when there is third data in both the full data and the full data obtained at the previous time granularity, but some attributes of the third data are modified, marking the third data as updated; and when fourth data in the full data is identical to fourth data in the full data obtained at the previous time granularity, ignoring the fourth data, wherein the first data, the second data, the third data, and the fourth data are different data, and the incremental data comprises the first data, the second data, and the third data.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining full data of a knowledge graph at a specified time;

calculating incremental data of the full data relative to full data obtained at a previous time granularity;

generating a version number of the incremental data at least partially based on the specified time;

dynamically mapping, by using a protocol and as a dynamic mapping, a node and an edge of the knowledge graph that are associated with the incremental data; and storing, as stored incremental data, the incremental data with reference to the version number.

\* \* \* \* \*